United States Patent [19]

Day, Jr.

[11] 3,729,679

[45] Apr. 24, 1973

[54] SUPPRESSED CARRIER SINGLE-SIDEBAND SIGNAL DETECTION

[75] Inventor: Lucius B. Day, Jr., Warminster, Pa.

[73] Assignee: The United States of America as represented by the Secretary of the Navy

[22] Filed: Aug. 30, 1971

[21] Appl. No.: 175,895

[52] U.S. Cl.......................325/49, 324/78 Q, 325/50, 325/138, 325/329, 325/363

[51] Int. Cl.................................................H04b 1/68

[58] Field of Search..........................325/49, 50, 133, 325/134, 329, 335, 336, 337, 363, 416, 417, 67, 138, 332; 324/77 C, 77 CS, 78 R, 79 R, 82, 88, 78 Q

[56] References Cited

UNITED STATES PATENTS

| | | | |
|---|---|---|---|
| 2,800,654 | 7/1957 | De Rosa | 324/79 |
| 2,496,560 | 2/1950 | Raymond | 325/337 |
| 2,283,616 | 5/1942 | Slonczewski | 324/78 |
| 3,537,009 | 10/1970 | Brooks, Jr. et al. | 325/133 |
| 2,972,108 | 2/1961 | Stone, Jr. | 325/363 |
| 3,649,920 | 3/1972 | Williams et al. | 325/363 |

*Primary Examiner*—Robert L. Griffin
*Assistant Examiner*—William S. Moore
*Attorney*—R. S. Sciascia et al.

[57] ABSTRACT

A single-sideband signal with an unknown suppressed carrier frequency is simultaneously processed through both an amplitude modulated (AM) receiver and a single-sideband (SSB) receiver. The AM receiver supplies an output signal to trigger the horizontal sweep circuit of an oscilloscope. The output of the SSB receiver is applied to the vertical input of the oscilloscope. The correct tuning of the SSB receiver to the carrier frequency causes a stationary signal to appear on the oscilloscope.

6 Claims, 3 Drawing Figures

INVENTOR
LUCIUS B. DAY, Jr.
BY
ATTORNEYS

Patented April 24, 1973 3,729,679

2 Sheets-Sheet 2

INVENTOR
LUCIUS B. DAY, Jr.
BY
ATTORNEYS

SUPPRESSED CARRIER SINGLE-SIDEBAND SIGNAL DETECTION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to single-sideband communication systems, and more particularly to a receiver system for obtaining the information data in a suppressed carrier single-sideband signal when the frequency of the suppressed carrier is unknown.

A well known disadvantage in the field of suppressed carrier single-sideband communications prior to the present invention was the inability of accurately tuning an SSB receiver to reintroduce into the system the suppressed carrier frequency of the transmitter if this frequency was not known in advance. A prior method used that is accurate to within 20–30 Hz of the correct frequency is by tuning an SSB receiver for the most natural voice timbre with the human ear. This error of 20–30 Hz is unacceptable for use in signal and frequency monitoring application as it does not meet the standards of accuracy of ± 5 parts in $10^6$ below 4 MHz and ± 1.5 parts in $10^6$ above 4 MHz as a national and international acceptable standard.

SUMMARY OF THE INVENTION

Accordingly, it is a general purpose of the present invention to determine the suppressed carrier frequency of an SSB voice signal when this frequency is not known beforehand. Further objects of the invention are that the equipment used should operate in real times, should yield a more reliable reproduction of an SSB transmitted signal and objective data not depending upon a value judgment by an operator, and should not be unduly complex or costly. In addition, the system should not rely upon the transmitting station for sending any additional information whatsoever other than an SSB voice signal.

This is accomplished according to the present invention by applying an SSB signal simultaneously to both an AM receiver and an SSB receiver. The receivers are aurally tuned to the same frequency until the audio signal from the SSB receiver is sensed as natural, intelligible and as free of distortion as possible. The output of the AM receiver is applied to the trigger circuit of an oscilloscope and the output of the SSB receiver is applied to the oscilloscope's vertical deflection plates. The SSB receiver is then fine tuned by adjusting the frequency of the receiver's local oscillator signal until the apparent lateral movement of a pattern on the oscilloscope is stopped. When the receiver is correctly tuned, the quasi-periodic waveform of long vowel sounds that are repeated over several successive approximately equal intervals of time will repeatedly overtrace the same basic pattern for a multiple of sweeps.

DESCRIPTION OF THE PREFERRED EMBODIMENT

Speech is a modulation process in which a "carrier" is modulated in several ways to convey information. This "carrier," in the case of voiced vowel sounds, consists of a fundamental vocal-cord tone and a broad spectrum of harmonics of this fundamental. The average fundamental frequency is about 130 Hz for male adults and about 250 Hz for females.

Voiced vowel sounds may be approximated by the sum of sinusoidal terms of the form $$v(t) = a_1\cos(\omega_o t) + a_2\cos(2\omega_o t) + a_n\cos(n\omega_o t) \quad (1)$$

where $\omega_0$ is the fundamental frequency in rad/sec and the coefficients $a_1$, $a_2$, etc. are constants.

After typical bandpass filtering having a 300 Hz to 3,000 Hz bandpass, equation (1) becomes $$s(t) + \cos(3\omega_o t) + \cos(4\omega_o t) + \ldots + \cos(7\omega_o t) \quad (2)$$

where $\omega_o$ is such that $3\omega_o > 300$ Hz and $7\omega_o < 3{,}000$ Hz.

Figure 1:
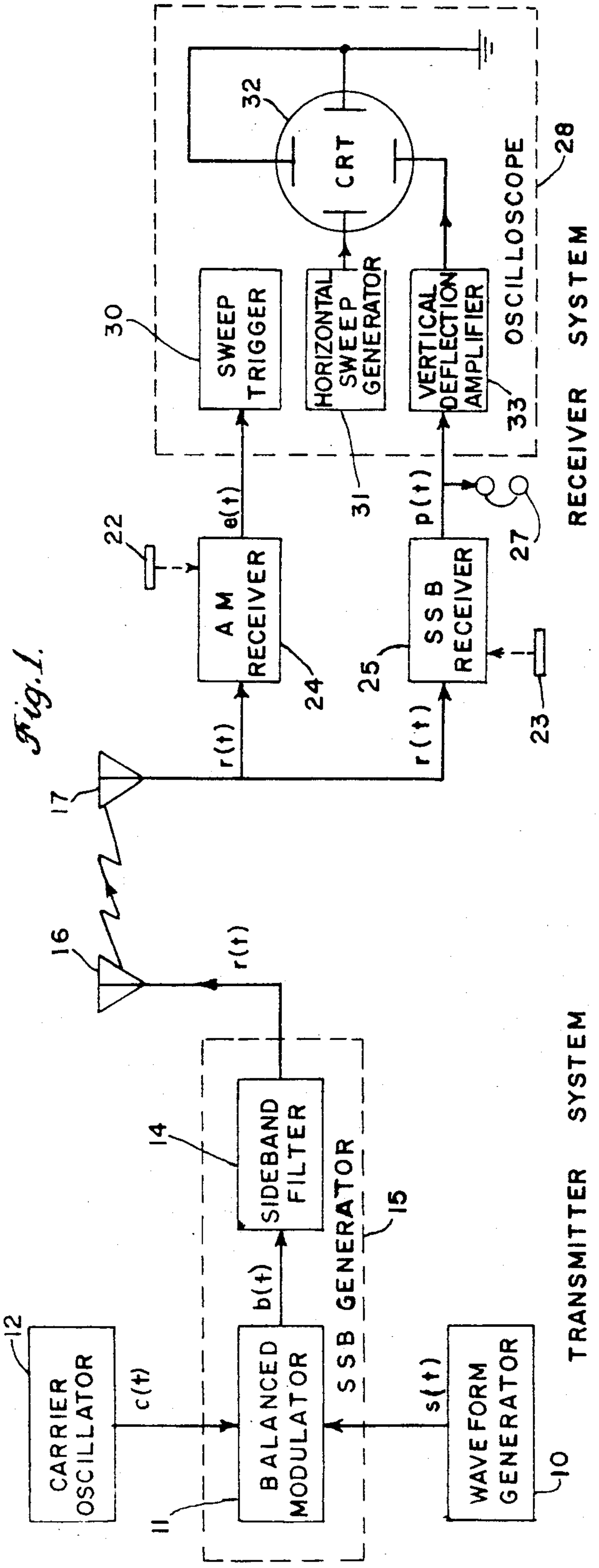
FIG. 1 is a block-schematic diagram of an SSB communication system in accordance with the present invention.
Figure 2:
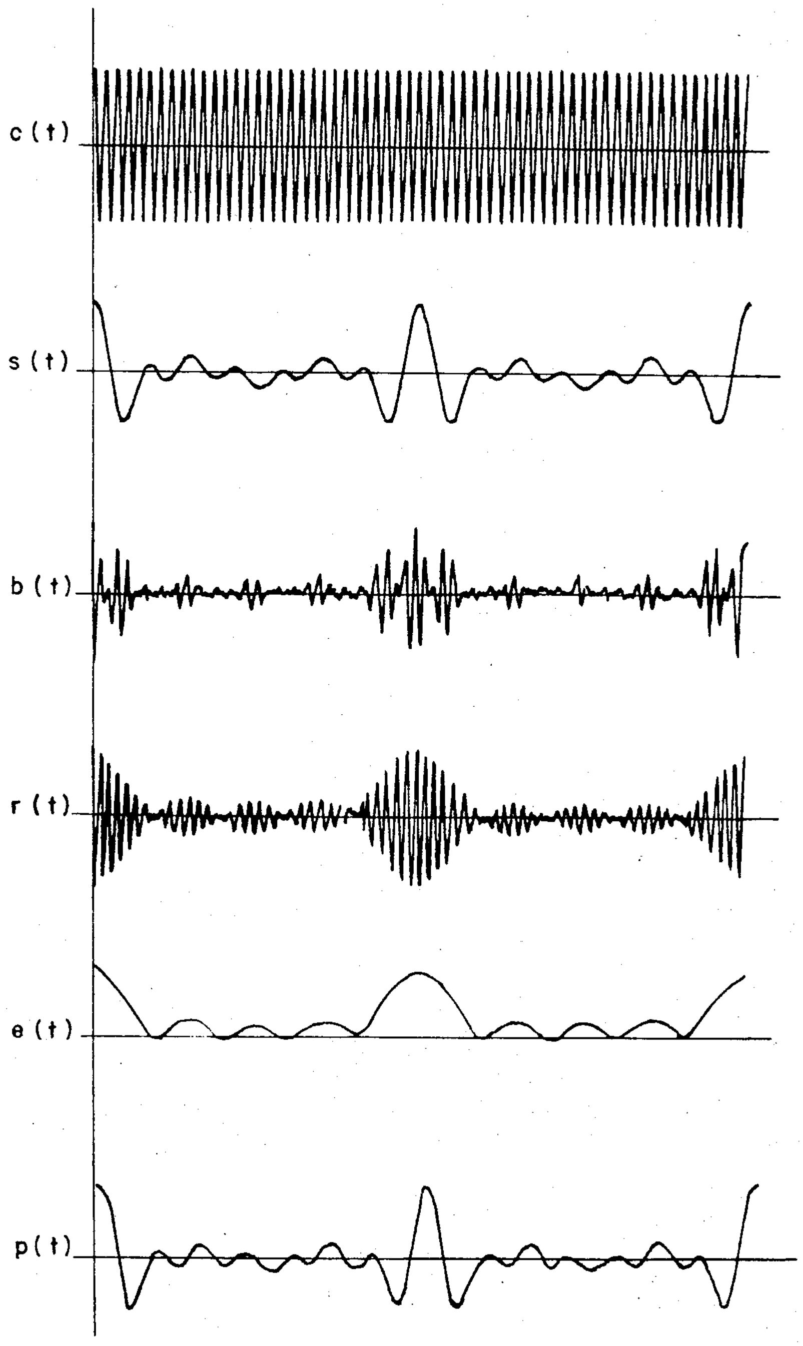
FIG. 2 represents a plurality of waveforms present in the system of FIG. 1.

Referring now to FIG. 1 and FIG. 2 a waveform generator 10 generates the signal $s(t)$ of equation (2) to a balanced modulator 11. In addition a carrier oscillator 12 supplies a carrier signal $c(t)$ at the frequency $\omega_c$to modulator 11. The output signal of modulator 11 is a double sideband signal $b(t)$ supplied to a sideband filter 14. The sideband filter 14 then provides only one of the sidebands, in the present case the upper sideband $r(t)$ of the signal received from modulator 11 to transmitting antenna 16. The combination of modulator 11 and filter 14 is referred to as a single sideband generator 15. The output of generator 15 $r(t)$ can be expressed as a sum of the following sinusoidal terms $$r(t) = \cos(3\omega_o + \omega_c)t + \cos(4\omega_o + \omega_c)t + \ldots + \cos(7\omega_o + \omega_c)t. \quad (3)$$

This upper sideband signal $r(t)$ is then transmitted by means of the antenna 16 and received by an antenna 17 that supplies the signal to both an AM receiver 24 and an SSB receiver 25 having respective tuners 22 and 23.

By using trigonometric substitution in equation (3), $r(t)$ may also be written as $$r(t) = 2[\tfrac{1}{2} + \cos(\omega_o t) + \cos(2\omega_o t)]\cos(5\omega_o + \omega_c)t \quad (4)$$

By letting $$E(t) = 2[\tfrac{1}{2} + \cos(\omega_o t) + \cos(2\omega_o t)] \quad (5)$$

then $$r(t) = E(t)\cos(5\omega_o + \omega_c)t \quad (6)$$

is recognized as being of the form of the product of an envelope function $E(t)$ and a carrier function $\cos(5\omega_o + \omega_c)t$. The AM receiver 24 upon receipt of the $r(t)$ signal rectifies it, removes the resulting d.c. component and produces at its output a signal $e(t)$ which is the a.c. portion of the magnitude of $E(t)$. The fundamental period of $e(t)$ is therefore the same as that of $E(t)$.

The SSB receiver 25 receives the $r(t)$ signal and supplies the output signal $p(t)$ to both headset 27 and the vertical deflection amplifier 33 of oscilloscope 28

$$p(t) = \cos(3\omega_o + \omega_c - \omega_d)t + \cos(4\omega_o + \omega_c - \omega_d)t + \ldots + \cos(7\omega_o + \omega_c - \omega_d)t \quad (7)$$

where a local oscillator signal injected in the SSB receiver 25 is of the form $$d(t) = 2\cos(\omega_d t). \quad (8)$$

For coherent detection $d(t)$ should have precisely the same frequency and phase as the suppressed carrier. If $\omega_d = \omega_c$ in equation (7), the detector signal $p(t)$ becomes the message function $s(t)$ of equation (2).

However, since $\omega_c$ is not known and aural tuning is subject to error there will generally be a frequency error $$\delta = \omega_d - \omega_c.$$

If $\delta$ is not equal to 0, equation (7) may be written $$p(t) = \cos(3\omega_o - \delta)t + \cos(4\omega_o - \delta)t + \ldots + \cos(7\omega_o - \delta)t. \quad (10)$$

A result of importance here is seen by comparing equation (2) with equation (10). Each term of equation (2) represents a harmonic of the fundamental $\omega_o$ for any value of $\omega_o$. In equation (10), the terms are harmonically related for all known values of $\omega_o$ only if $\delta = 0$. The significance of this is the known result that SSB mistuning does not simply alter the pitch of a group of harmonic tones it also alters the harmonic relationship.

The output $e(t)$ of the AM receiver 24 is applied to a sweep triggering circuit 30 of oscilloscope 28 which controls the horizontal linear sweep circuit 31. On the amplitude of $e(t)$ reaching a predetermined value after a sweep has been completed a new sweep is initiated. Since the output $p(t)$ of the SSB receiver 25 is applied to headphones 27 and a vertical deflection amplifier 33 of oscilloscope 28 the signal $p(t)$ is displayed on cathode ray tube 32 as a function of the frequency of the signal $e(t)$.

Figure 3:
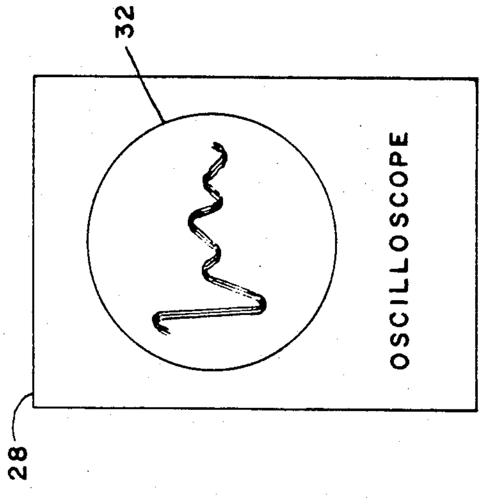
FIG. 3 represents a pictorial view of waveforms on an oscilloscope of FIG. 1

If $v(t)$ of equation (1) is periodic with a period $T_0$ where $$T_0 = 2\pi/\omega_o \quad (11)$$

then $s(t)$ and $e(t)$ are both periodic with the same period. Therefore, it may be seen that the output of the AM receiver $e(t)$ while being used to provide a new horizontal trace on the oscilloscope provides a frequency standard which the output $p(t)$ must meet in order to provide a repeating trace on the oscilloscope as shown in FIG. 3. When the tuner 22 is properly adjusted so that the frequency $\omega_c$ is equal to $\omega_d$ the SSB receiver 25 is properly tuned and the output $p(t)$ is equal to $s(t)$. This is shown in FIG. 2.

The function $e(t)$ is not, in general, an intelligible replica of either the voice approximation $v(t)$ or the simplified periodic message function $s(t)$. Of importance is the result that $e(t)$ is periodic with the same period as $v(t)$ and $s(t)$. This signal $e(t)$ has a complex harmonic structure which is different from that of $s(t)$, but the harmonics of $e(t)$ are harmonics of the same fundamental frequency present in $s(t)$. Since the envelope detection process is independent of the local oscillator signal frequency $\omega_d$, the harmonic structure of $e(t)$ is not affected by a tuning error of the receiver 25.

The operation of the system will now be described with reference to the figures. The waveform generator 10 which may be a microphone and associated preamplifier and amplifier circuits provides a modulating signal $s(t)$ to balanced modulator 11. The carrier oscillator 12 also provides a signal $c(t)$ to the modulator 11. The modulator 11 provides a double-sideband suppressed carrier signal $b(t)$ to sideband filter 14 which supplies the upper sideband signal $r(t)$ to the antenna 16. The antenna 17 receives the upper sideband signal $r(t)$ and supplies it to both AM receiver 24 and the SSB receiver 25. The tuner 23 of the SSB receiver 25 is adjusted until as clear a signal as possible is aurally obtained by headphones 27. The tuner 22 of AM receiver 24 is then adjusted to the same frequency as the SSB receiver 25. The output of the AM receiver 24 is supplied to the sweep triggering circuit 30 of oscilloscope 28 and the output of the SSB receiver 25 is supplied to the vertical deflection amplifier 33 of oscilloscope 28. The SSB receiver 25 is then tuned by means of tuner 23 until the signal shown on cathode ray tube 32 of oscilloscope 28 is as constant as can be obtained with each successive trace overlapping the previous trace and the signal $p(t)$ displayed neither moving to the left nor the right.

An alternate signal that could obviously be processed by the AM receiver 24 is a signal taken from the IF stage (not shown) of SSB receiver 25. This would result in the AM receiver providing the identical $e(t)$ signal previously described.

It has therefore been shown that a fine degree of tuning may be obtained in an SSB receiver system without previous knowledge as to the carrier signal frequency. The system utilizes the fact that an AM receiver through its demodulation process although supplying an unintelligible signal supplies a signal of the same frequency as the modulating signal used to generate the SSB signal. This unintelligible signal is then used to provide a frequency match between the output of the SSB receiver and the AM receiver.

It will be understood that various changes in the details, materials, steps and arrangements of parts, which have been herein described and illustrated in order to explain the nature of the invention, may be made to those skilled in the art within the principle and scope of the invention as expressed in the appended claims.

What is claimed is:

1. A system for detecting information in a suppressed-carrier single-sideband signal formed by a modulating signal with a fundamental frequency on a carrier signal of unknown frequency, comprising:

first means for receiving the single-sideband signal and having an adjustable tuner for providing an output signal which is a replica of the modulating signal;

second means connected to said first means for converting said first means output signal to an acoustic signal;

third means for receiving and envelope demodulating the single-sideband signal and providing an output signal having the same fundamental frequency as that of the modulating signal; and fourth means connected to receive the outputs of said first and third means for comparing the fundamental frequencies of the outputs.

2. A detecting system according to claim 1 wherein said fourth means further comprises:

an oscilloscope having triggering means connected to said third means and actuated at the fundamental frequency of said third means output signal, a vertical amplitude circuit connected to receive the replica modulating signal, and a cathode ray tube connected to said triggering means and said amplitude circuit for displaying the replica modulating signal in time increments determined by the fundamental frequency of the third means output signal.

3. A system according to claim 2 wherein said second means comprises a headphone.

4. A detecting system according to claim 3 wherein said third means comprises an amplitude modulated receiver.

5. A single-sideband communication system comprising:

a carrier oscillator for generating a carrier frequency signal;

a waveform generator for generating an amplitude modulated signal;

a single-sideband generator connected to receive the carrier frequency and amplitude modulated signals for generating a suppressed carrier single-sideband signal;

a first antenna connected to said single-sideband generator for transmitting said single-sideband signal;

a second antenna adapted to receive said single-sideband signal;

a single-sideband receiver having an adjustable tuner connected to said second antenna for producing a replica of the amplitude modulated signals;

a transducer connected to said single-sideband receiver for converting said replica signal to an acoustic signal;

an amplitude modulated receiver connected to said second antenna for providing an output signal having the same fundamental frequency as the amplitude modulated signal; and an oscilloscope having triggering means connected to said amplitude modulated receiver for being actuated at the fundamental frequency of said amplitude modulated receiver output signal, a vertical amplitude circuit connected to receive said replica signal and a cathode ray tube connected to said triggering means and said amplitude circuit for displaying said replica signal in time increments determined by the fundamental frequency of said amplitude modulated receiver output signal.

6. A single-sideband communication system according to claim 5 wherein said single-sideband generator further comprises:

a balanced modulator for generating a suppressed carrier double-sideband signal upon receipt of said carrier frequency and said amplitude modulated signals; and a sideband filter connected to said balanced modulator for passing a single-sideband signal of said double-sideband signal.

* * * * *